L. F. ADT.
EYEGLASSES.
APPLICATION FILED JULY 16, 1908.

987,100.

Patented Mar. 21, 1911.

Witnesses
Walter B. Payne.
H. T. Simms

Inventor
Leo F. Adt
By Church & Pick
his Attorneys

UNITED STATES PATENT OFFICE.

LEO F. ADT, OF ALBANY, NEW YORK.

EYEGLASSES.

987,100.  Specification of Letters Patent.  Patented Mar. 21, 1911.

Application filed July 16, 1908. Serial No. 443,806.

*To all whom it may concern:*

Be it known that I, LEO F. ADT, of Albany, in the county of Albany and State of New York, have invented certain new and useful Improvements in Eyeglasses; and I do hereby declare the following to be a full, clear, and exact description of the same, reference being had to the accompanying drawings, forming a part of this specification, and to the reference-numerals marked thereon.

The present invention relates to eyeglasses and it has for an object to provide a construction which will insure greater comfort to users and at the same time lessen the labor of opticians in fitting eyeglasses.

To these and other ends the invention consists in certain improvements and combinations of parts all as will be hereinafter more fully described, the novel features being pointed out in the claims at the end of the specification.

Figure 1:
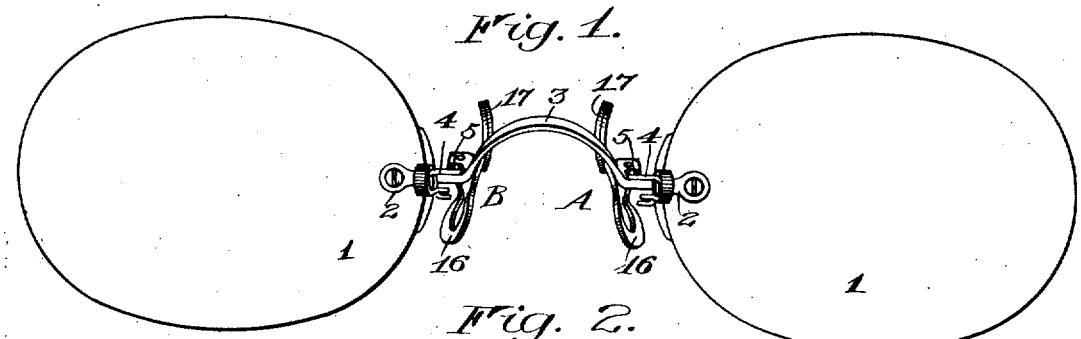
Figure 2:
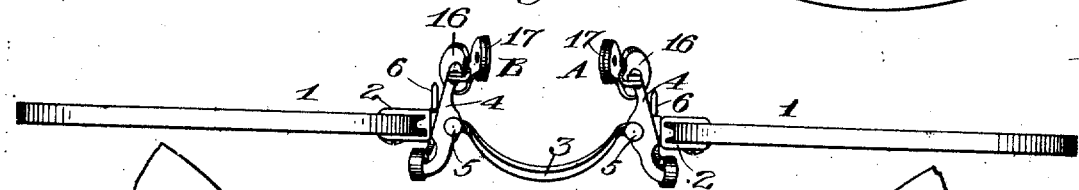
Figure 3:
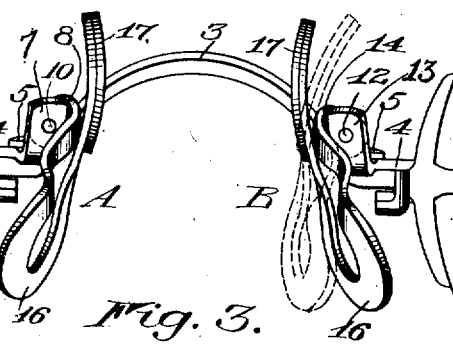
Figures 4, 5, 6:
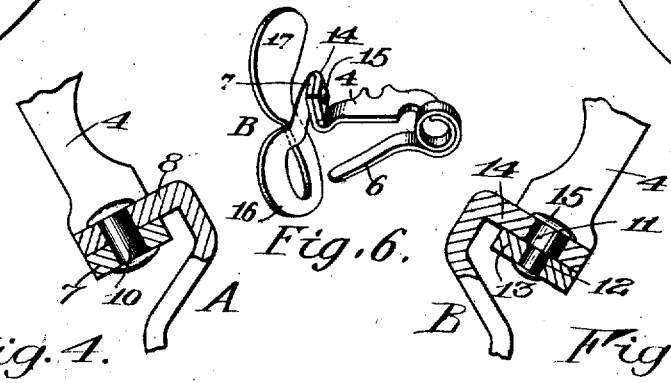

In the drawings: Figure 1 is a front view of a pair of eyeglasses embodying this invention; Fig. 2 is a top view; Fig. 3 is a rear view; Figs. 4 and 5 are detail horizontal sections of the portions permitting the adjustments of both nose guards and Fig. 6 is a perspective view of one of the guards.

When two non-adjusting or non-rocking nose guards of a pair of eyeglasses are adjusted to a nose not only is a great deal of time consumed in the fitting but a perfect adjustment is not obtained and consequently injury to the nose often results. Making both nose guards self adjusting or so that they will rock freely will in many instances overcome these disadvantages but it is practically impossible with this construction to hold two lenses in the same plane as there is a tendency for the glasses to wabble in a vertical direction.

In this invention I secure the eyeglasses against wabbling in a vertical direction and at the same time lessen the labor of fitting and obviate the probability of injury to the nose, by mounting the nose bearing member of one nose guard so that it will be self adjusting or adapted to rock freely and by mounting the other so it will be non-adjusting or rigidly supported.

Referring particularly to the drawings, wherein I have shown the invention embodied in a so called finger piece eyeglass, 1 indicates the lenses and 2 lens attaching devices of any suitable construction connected by a bridging portion 3 forming with the attaching devices a support for the lenses.

Arranged on the support are the two nose guards A and B. The nose guard A is non-adjusting to conform to the taper of the nose and comprises in this instance a supporting member consisting of an arm or lever 4 mounted to swing substantially in a horizontal plane on a pivot 5 located between its ends on the support, the arm projecting forwardly and rearwardly from the support. Its forwardly extending portion acts as a finger piece by which the guard is operated while its rearwardly extending portion carries a nose bearing member, a spring, preferably an arm 6, serving to move the nose bearing member toward the nose. In order to support the nose bearing member, arm 4 may be formed with an upwardly deflected or vertically offset portion 7 to which is secured preferably a portion 8 that projects outwardly from the nose bearing member at a point substantially midway between the upper and the lower end thereof.

The means for securing the nose bearing member to the supporting arm or lever 4 permits the member to be initially adjusted to conform to the taper of one side of the wearer's nose and after adjustment to be rigidly secured to its supporting arm in order to maintain its adjustment. In this instance, this result is secured by passing a rivet 10 horizontally through the offset portion 7 and through outwardly turned portion 8, and setting the ends of the rivet, to clamp the nose engaging member against movement. Of course the guard may be formed in the first instance to conform to the nose, and this initial adjustment dispensed with, but this will require the formation of a separate guard for each nose, whereas in this construction one guard may be made to fit any one of a number of noses. The self adjusting guard B comprises in this instance also a lever 4, a spring 6 and a nose bearing member arranged on the rearwardly extending portion of the lever. The self adjustment is preferably obtained by mounting the nose bearing member on its supporting arm or lever 4 so that it may rock freely. For this purpose the lever may carry a horizontally arranged bearing or pivot 11 which extends longitudinally of and parallel with the lever 4 and has a reduced portion 12 passed through and secured to a vertically offset portion 13 on the lever. In order to coöperate with this pivot, the nose bearing member has an outwardly extending bearing portion 14 perforated to receive the pivot and held thereon by a flange or head 15. The rear of the nose bearing member is arranged to coöperate with the inner side wall of the offset portion 13 in order to limit the movement of the nose bearing member about its axis.

The nose bearing members of both guards may consist of a lower bearing pad 16 formed by a loop arranged transversely of the plane of the lenses, and an upper bearing pad 17 connected to one arm of the loop in order to yield relatively to the lower pad.

In operation, the nose guards are separated by pressing the forward ends of levers 4 toward each other and then the eyeglasses are positioned on the nose. Upon the release of the guards the non-adjusting one will engage the side of the nose for which it has been adjusted, and the self-adjusting one will automatically conform to the taper of the other side of the nose.

Eyeglasses constructed in accordance with this invention are easy to fit, thus recommending them to the trade, and at the same time the user obtains greater comfort as a pinching of the nose is impossible; provided a bridge of proper length is employed.

What I claim is:

1. Eyeglasses embodying a self-adjusting guard and a non-adjusting guard, the self adjusting guard being movable relatively to both lenses.

2. Eyeglasses embodying a guard having a non-rocking nose engaging member and a guard having a nose engaging member mounted to rock freely about a point substantially midway of its nose engaging portions.

3. Eyeglasses embodying a guard comprising a supporting arm and a nose bearing member mounted to rock freely thereon at a point substantially midway of its nose engaging portion to conform to the taper of the nose; and a guard comprising a supporting arm having the nose bearing member rigidly supported thereon.

4. Eyeglasses embodying a self adjusting guard and a non-adjusting guard provided with means permitting an initial adjustment.

5. Eyeglasses embodying a guard provided with an upper and lower nose bearing portion and mounted to rock freely about a point substantially midway between its upper and its lower nose engaging portions, and a non-adjusting guard provided with an upper and a lower nose bearing portion and having means permitting its initial adjustment about a point located substantially midway between its upper and its lower end.

6. Eyeglasses embodying a non-rocking guard having means permitting an adjustment about a point substantially midway between its upper and lower end, and a self-adjusting guard mounted to rock freely about a point substantially midway between its upper and lower ends.

7. Eyeglasses embodying a self-adjusting guard comprising a supporting arm and a nose bearing member mounted to rock freely thereon about a point substantially midway between its upper and lower end to conform to the nose of the wearer; and a non-adjusting guard comprising a supporting arm, and a nose bearing member rigidly supported on the arm and adjustable about a point midway between its upper and lower end.

8. In eyeglasses, the combination with a support, of a pair of nose guards each comprising a lever mounted to swing on the support substantially in a horizontal plane, and projecting forwardly and rearwardly from the support, the lever of one of said guards carrying a self-adjusting nose bearing member, and the lever of the other guard carrying a non-adjusting nose bearing member.

9. In eyeglasses, the combination with a support, of a pair of nose guards each embodying a nose bearing member and a lever mounted on the support to swing substantially in a horizontal plane and projecting forwardly and rearwardly from the support, the rearwardly projecting portion carrying the nose bearing member, one of said guards having its nose bearing member rigidly supported on its lever and the other guard having its nose bearing member mounted to rock freely on its lever.

LEO F. ADT.

Witnesses:
RUSSELL B. GRIFFITH,
HAROLD H. SIMMS.